United States Patent
Meuter et al.

(10) Patent No.: US 8,055,020 B2
(45) Date of Patent: Nov. 8, 2011

(54) METHOD FOR OBJECT TRACKING

(75) Inventors: Mirko Meuter, Gruiten (DE); Uri Iurgel, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 740 days.

(21) Appl. No.: 12/231,331

(22) Filed: Aug. 29, 2008

(65) Prior Publication Data

US 2009/0080701 A1    Mar. 26, 2009

(30) Foreign Application Priority Data

Sep. 20, 2007    (EP) ..................................... 07018503

(51) Int. Cl.
*G06K 9/00*    (2006.01)
*H04N 5/225*    (2006.01)

(52) U.S. Cl. ........................................ 382/103; 348/169

(58) Field of Classification Search .................. 382/103, 382/107, 190, 236; 348/94, 154, 155, 169, 348/170, 171, 172, 208.1, 208.2, 208.14, 348/208.16, 352; 340/648, 925, 944; 342/28, 342/90

See application file for complete search history.

(56) References Cited

U.S. PATENT DOCUMENTS

| | | | | |
|---|---|---|---|---|
| 5,216,501 A | * | 6/1993 | Ando | 348/416.1 |
| 5,638,116 A | * | 6/1997 | Shimoura et al. | 348/118 |

OTHER PUBLICATIONS

Ponsa D et al: "Multiple Vehicle 3D Tracking Using an Unscented Kalman Filter" Intelligent Transportaion Systems, 2005. 2005 IEEE Vienna, Austria Sep. 13-16, 2005, Piscataway, NJ, USA, IEEE, Sep. 13, 2005; 1108-1113.

Bertozzi M et al: "Shape Based Pedestrian Detection and Localization" Intelligent Transportation Systems 2003, Piscataway, NJ, USA, IEEE, Bd. 1, Oct. 12, 2003, 328-333.

Binelli E. et al: "A Modular Tracking System for Far Infrared Pedestrian Recognition" Intelligent Vehicles Symposium, 2005. Proceedings, IEEE Las Vegas, NV, USA, Jun. 6-8, 2005; 759-764.

Van Der Merwe R. et al; "The Square-Root Unscented Kalman Filter for State and Parameter-Estimation" 2001 IEEE International Conference on Acoustics, Speech, and Signal Processing. Proceedings. (ICASSP). Salt Lake City, UT, May 7-11, 2001, IEEE Internationl Conference on Acoustics, Speech and Signal Processing (ISASSP), New York, NY; May 7, 2005; 3461-3464.

* cited by examiner

*Primary Examiner* — Abolfazl Tabatabai
(74) *Attorney, Agent, or Firm* — Thomas N. Twomey

(57) ABSTRACT

The present invention relates to a method for the recognition and tracking of a moving object, in particular of a pedestrian, from a motor vehicle, at which a camera device is arranged. An image of the environment including picture elements is taken in the range of view of the camera device (20) by means of the camera device at regular time intervals and those picture elements are identified with the help of an image processing system which correspond to moving objects to be tracked. A picture element is extracted for each of these objects which represents a projection in image coordinates of that spatial point at which the object contacts a road plane The movement of the corresponding spatial point in the road plane is tracked by means of a state estimator which uses an at least four-dimensional state vector whose components are a position of the spatial point in the road plane and an associated speed in the road plane, wherein the tracking of the movement by the state estimator includes the steps that a prediction is generated for the state vector, this prediction is converted into image coordinates via suitable projection equations, an error to be expected for this prediction is calculated in image coordinates by means of a covariance matrix, and this prediction is compared with the picture element extracted in a later image and is updated.

13 Claims, 2 Drawing Sheets

METHOD FOR OBJECT TRACKING

TECHNICAL FIELD

The present invention relates to a tracking method for the recognition and tracking of a moving object. It more precisely relates to a method for the recognition and tracking of a moving object, in particular a pedestrian, from a motor vehicle. In this connection, a camera device is arranged at the motor vehicle by means of which an image of the environment comprising picture elements in the range of view of the camera device is taken.

BACKGROUND OF THE INVENTION

Methods of this type for object tracking, so-called tracking methods, are generally known. Applications are also already known in the automotive sector in which tracking methods are used to track and predict the movement of a pedestrian or also of a cyclist or of another vehicle, so that an impending collision can be predicted at an early stage. The vehicle can be braked via a driver assistance system in the event of an impending collision, in particular with a pedestrian, or suitable safety devices can be activated. Alternatively or additionally, an alarm signal can be emitted to warn the driver.

A difficulty of such applications in this connection is that not only the object to be tracked, for example a pedestrian, is moving, but also the camera fixed to the vehicle. These two movements overlap and the resulting movement between two images taken sequentially by the camera device is difficult to model. It has previously not been possible to provide a satisfactory method for object tracking with the assistance of a moving camera. On the one hand, the quality of the predictions which can be achieved with conventional processes is often not satisfactory; on the other hand, a comparatively large computing power is needed to evaluate the images taken by the camera in real time.

SUMMARY OF THE INVENTION

It is therefore the underlying object of the present invention to provide a method of the initially named kind which is in a position to deliver reliable results with a computing effort which is as low as possible.

With the help of an image processing system, those picture elements are identified in the taken image which correspond to tracked moving objects. A picture element is then extracted for each of these objects which represents a projection in image coordinates of that spatial point at which the object to be tracked contacts a road plane. A group of a plurality of picture elements disposed close to one another can naturally also be extracted. These selected picture elements, for example, correspond in three-dimensional space to a foot of a pedestrian who is crossing a road. The movement of the corresponding spatial point in the road plane is tracked by means of a state estimator which uses an at least four-dimensional state vector whose components are a position x, y of the spatial point in the road plane and an associated speed $v_X$, $v_Y$ in the road plane.

In the method in accordance with the invention, it is therefore not, for instance, a three-dimensional movement which is tracked, but rather only a movement of one or more spatial points in the road plane. The computing effort required for the object tracking can thereby be considerably reduced. In addition, objects which do not move exclusively in the road plane are automatically filtered out. Since those objects whose tracking is sensible for an application in the motor vehicle, i.e. pedestrians, cyclists and any desired vehicles, always move substantially in the road plane, computing power is saved in a sensible manner by this filtering. It is namely avoided, without any additional effort in the object recognition, that computing power is used for the tracking of moving objects not of interest in the present context such as birds, branches moved by the wind, etc.

The state estimator used in the method in accordance with the invention has a prediction-correction structure. A prediction is first generated for the state vector. This prediction is converted into image coordinates via suitable projection equations and an error to be expected is calculated for the prediction in image coordinates by means of a covariance matrix. Subsequently, the prediction is compared with the picture element extracted in a later image and is updated.

A method step generally follows the method in accordance with the invention in which the tracked objects are classified. This classification method can also already be carried out before the tracking, that is before the object tracking. Since the classification of the objects requires more computing power than the object tracking, it is, however, more advantageous first to track unknown objects and only to classify the tracked objects afterward. Classification methods with which it can, for example, be recognized whether the tracked object is a pedestrian have been described in detail in the literature and are not the subject of the present invention so that the classification will not be looked at in more detail in the following.

Advantageous embodiments of the invention can be seen from the following description.

A recursive state estimator is preferably used as the state estimator which assumes that the tracking process has a structure similar to a so-called hidden Markov model. It is assumed that the state behaves in accordance with a first order Markov chain and is only dependent on the respectively last state and that the measured value emitted at any time is only dependent on the respective current state.

The use of a Kalman filter, in particular of an unscented Kalman filter has proved particularly advantageous. Since the projection of a spatial point into the image plane cannot be described by a linear equation, only variants of the Kalman filter can be considered which permit states of non-linear systems also to be estimated. An extended Kalman filter can thus be used, for example. The extended Kalman filter is based on a linearization of the system equations and is therefore only a reliable estimator for small sampling intervals. The information loss which arises on the use of an extended Kalman filter can be reduced in that a plurality of representative state vectors are used for the prediction in the prediction. The unscented Kalman filter makes use of this and good results were able to be achieved with an unscented Kalman filter in trials. Alternatively, however, the use of a particle filter, of a sigma-point Kalman filter or of any other suitable filters is also conceivable.

The state estimator preferably uses a linear system equation to compute the estimated value for the state vector. The calculation is thereby simplified.

Such a linear system equation can, for example, model the change in the state vector as a uniform movement of the position x, y of the spatial point in the road plane with the speed $v_X$, $v_Y$. A uniform movement of the spatial point to be tracked is simple to model so that the calculations can be carried out with a justifiable effort. Since pedestrians or vehicles generally move approximately with a uniform speed at least within comparably short periods, good results are achieved with such a system equation with sufficiently small time intervals between the images taken.

A translation and a rotation of the vehicle can additionally also be taken into account. Advantageously, the translation and the rotation of the vehicle are determined from the sensor data of a speed sensor and of a yaw rate sensor which are generally anyway available in the vehicle. In this connection, the rotation derives directly from the determined yaw rate w, whereas the translation can be computed under the assumption that the vehicle is moving at the rim of a circle with the radius r=v/w, where v is the vehicle speed. The component of the vehicle translation in the direction of travel, tx, and the component of the vehicle translation transversely to the direction of travel, ty, can then be calculated in dependence on the rotation from tx=r*sin(w*dt) und ty=r*(1−cos(w*dt)). It is naturally generally also possible to determine the rotation and the translation in another manner or to use different sensors for this purpose.

The computational consideration of the translation and of the rotation can take place in that the state vector x, y, $v_x$, $v_Y$ is transformed into a coordinate system which moves with the vehicle and thus with the camera device. The origin of this coordinate system lies in the road plane at the level of the camera device and an axis of the coordinate system faces in the direction of travel. The system equation in this case then consists of the uniform movement of the spatial point to be tracked and of the coordinate transformation into a coordinate system fixed with respect to the vehicle, with the latter taking a rotation and a translation of the vehicle into account.

In this procedure, a more precise prediction is obtained in comparison with models in which the vehicle's own movement is not taken into account separately.

In accordance with a preferred embodiment of the invention, a directional beam is determined for the extracted picture element which includes those spatial points in the range of view which were projected onto the respective picture element on a projection onto the image. The camera is therefore modeled as a pinhole camera. While using extrinsic and intrinsic parameters of the camera device, that spatial point on the vision beam can then be determined via a back projection at which the object contacts the road plane.

The reverse projection, via which a predicted state vector can be converted from spatial coordinates into image coordinates, corresponds to a projection of the road plane into the image plane. This projection from the road plane into the image plane is preferably likewise modeled using a pinhole camera model. The projection and the back projection are non linear so that, as already mentioned above, a state estimator suitable for non linear systems should be used. Reference is made for the mathematical details of such a projection to the article by Pascal Fua Vincent Lepetit "Monocular model-based 3d-tracking of rigid objects: A survey", Foundations and Trends in Computer Graphics and Vision, Vol. 1, No. 1 (2005), 189.

A first covariance matrix which corresponds to the error to be expected of the state vector x, $v_x$, y, $v_y$ is preferably composed of two terms. In this connection, a first term depends on the system equation of the state estimator and on a covariance matrix computed in a preceding step, whereas the second term is a noise matrix Q which models additive white acceleration noise.

A second covariance matrix which corresponds to an error to be expected in image coordinates can be computed from the covariance matrix of the state vector. For this purpose, the covariance matrix of the state vector is first transformed into the image space with the help of a suitable transformation, preferably an unscented transformation. A constant noise covariance matrix is added to this variable portion. The fact is taken into account by this procedure that a noise which is constant in world coordinates does not result in a constant noise in image coordinates since the projection of the road plane into the image plane is non linear. The error in image coordinates becomes the larger, the closer to the camera device the object to be tracked is.

A further subject of the invention is a computer program with programming code means to carry out the method in accordance with the invention when the program is carried out on a computer or on a corresponding computing unit.

A computer program product is also a subject of the invention having programming code means stored on a computer legible data carrier to carry out the method in accordance with the invention when the computer program is carried out on a computer or on a corresponding computing unit.

In this connection, a computer is understood as any desired data processing device with which the method can be carried out. They can in particular have digital signal processors and/or microprocessors with which the method can be carried out fully or in parts.

Finally, the subject matter of the invention is an apparatus for the recognition and tracking of a moving object, in particular of a pedestrian, from a motor vehicle comprising a camera device arranged at the motor vehicle for the taking of an image and a data processing device which is made for the carrying out of the method described above.

BRIEF DESCRIPTION OF THE DRAWINGS

The invention will be described in the following by way of example with reference to the attached Figures.

The Figures show in a schematic representation in each case.

DESCRIPTION OF THE PREFERRED EMBODIMENTS

Figure 1:
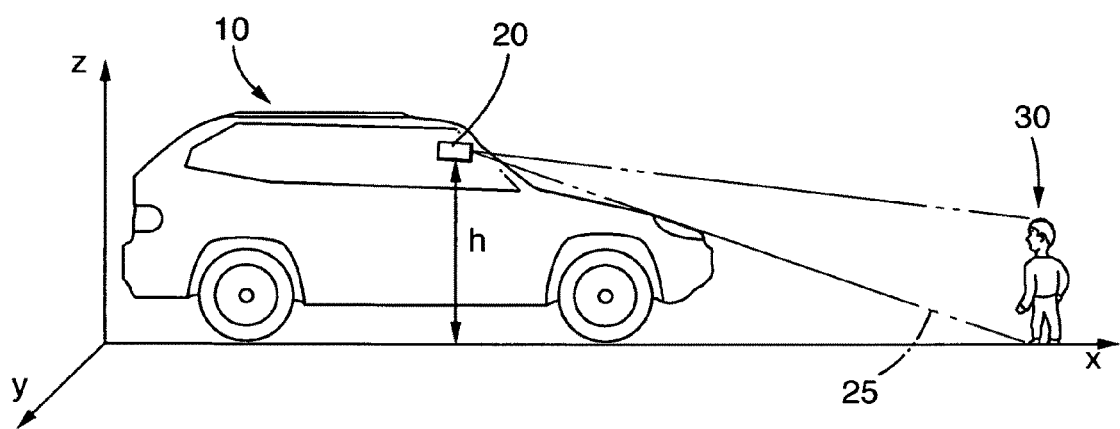
FIG. 1 is a motor vehicle having a camera device and a pedestrian.

FIG. 1 shows a motor vehicle 10 having a camera device 20 attached in a front region of the vehicle headlining. The camera device 20 takes an image of the environment comprising picture elements in the visual range of the camera device. It covers a pedestrian 30, as is indicated by the directional beams 25.

The space in which both the vehicle 10 and the pedestrian 30 move is spanned by the three coordinate axes x, y, z, with the x-y plane (z=0) corresponding to a road plane. The camera device 20 is above the road plane by a height h.

With the help of an image processing system, those picture elements u, v, are identified in the taken image which correspond to a pedestrian to be tracked 30. An picture element u, v is then extracted for this pedestrian 30 which represents a projection in image coordinates of that spatial point at which the object to be tracked contacts a road plane.

Figure 2:
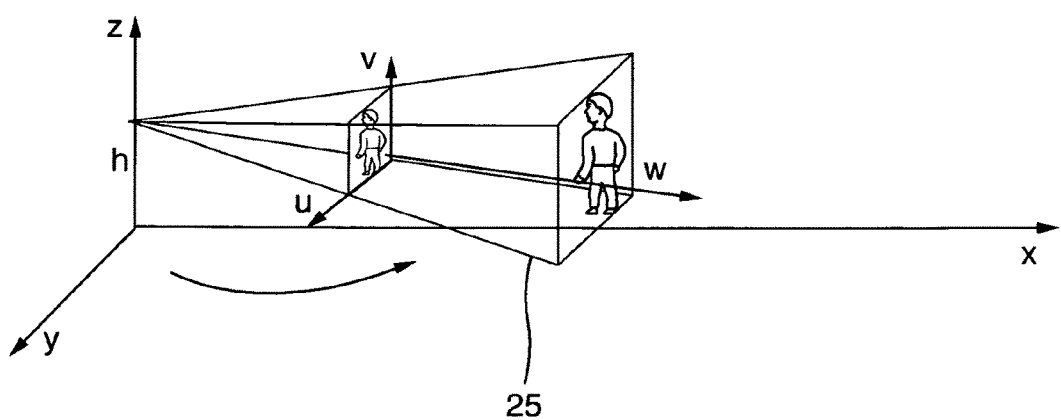
FIG. 2 is a representation to illustrate a projection of spatial points into the image plane.

FIG. 2 illustrates the projection from the space x, y, z in image coordinates u, v, w (w=0). The camera device 20 is modeled as a pinhole camera. A directional beam 25 which includes those spatial points x, y, z in the visual range which were projected onto the image onto the respective picture element u, v on a projection thus exists for each picture element u, v. That spatial point x, y, z on the sight ray 25 which actually corresponds to the respective picture element u, v can be determined via a back projection using extrinsic and intrinsic parameters of the camera device 20, in particular also the height h of the camera device 20.

The movement of the corresponding spatial point x, y in the road plane is tracked by means of a state estimator which uses a four-dimensional state vector whose components are a position x, y of the spatial point in the road plane and an associated speed $v_X$, $v_Y$ in the road plane.

Only a two-dimensional movement of the spatial point x, y is therefore tracked in the road plane. If the spatial point x, y moves beyond the road plane in the z direction during the carrying out of the tracking algorithm, it cannot be tracked further with the method in accordance with the invention. Since pedestrians and vehicles substantially move in the vehicle plane, moving objects are filtered in this manner which cannot be pedestrians or vehicles.

A prediction for the state vector x, y, $v_X$, $v_Y$ is generated with the help of an unscented Kalman filter.

First, the filter is initialized. For this purpose, an initial error in the image plane is estimated and transformed with the help of the unscented transformation. The result of the transformation is used to initialize the terms for the position error in the covariance matrix. The terms for the variance of the speed in the x and y directions are initialized with constant values and are considered as statistically independent of the position error. In addition, it is assumed that the spatial point initially does not move ($v_X = v_Y = 0$).

The change in the state vector is then modeled as a uniform movement of the position x, y of the spatial point with the speed $v_X$, $v_Y$.

Figure 3:
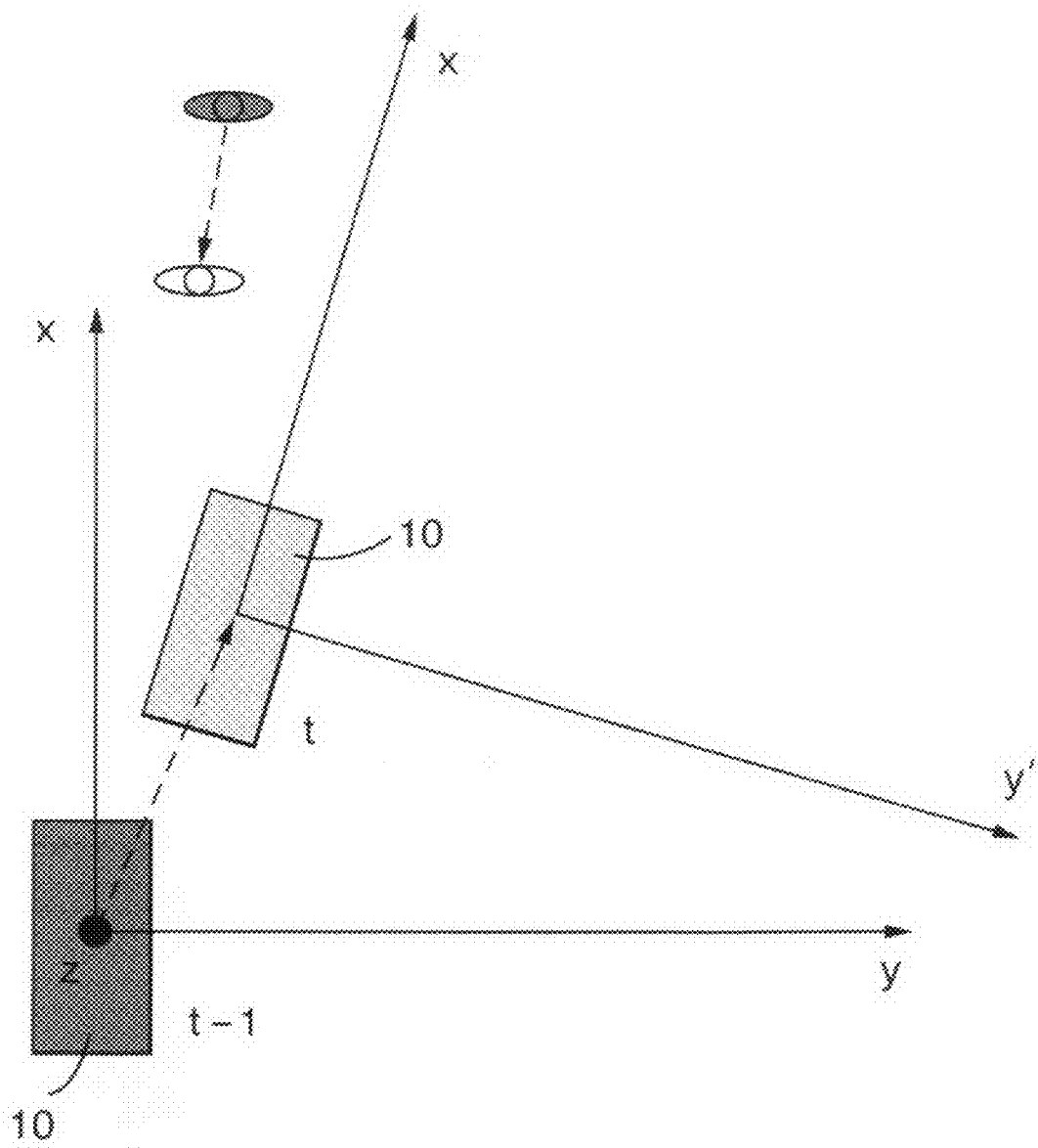
FIG. 3 is a representation to illustrate a coordinate transformation.

The translation and the rotation of the vehicle are measured with the help of a yaw rate sensor and of a speed sensor and flow into the system equation for the prediction of the state vector, as is illustrated in FIG. 3.

The state vector x, y, $v_X$, $v_Y$ is transformed from the coordinate system x, y into a coordinate system x', y' which moves with the vehicle and thus with the camera device. The origin of this coordinate system x', y' lies in the road plane at the level of the camera device 20 and an axis x' of the coordinate system x', y' faces in the direction of travel. The system equation is thus composed of the uniform movement of the spatial point x, y to be tracked and of the coordinate transformation shown in FIG. 3 into a coordinate system x', y' fixed with respect to the vehicle, with said coordination transformation taking account of the rotation and translation of the vehicle 10 which has taken place between a time t−1 and a time t.

An error to be expected for the prediction of the state vector x, $v_x$, y, $v_y$ is computed by means of a first covariance matrix. The corresponding covariance matrix is composed of a first term dependent on the system equation of the state estimator and a noise matrix modeling additive white acceleration noise.

The prediction for the state vector x, y, $v_X$, $v_Y$ is converted via the non linear projection equations into picture coordinates u, v.

A second covariance matrix which corresponds to an error to be expected in picture coordinates is computed from the covariance of the state vector. For this purpose, the covariance matrix of the state vector is first transformed into the image space with the help of an unscented transformation. A constant noise covariance matrix is added to this variable portion.

Subsequently, the prediction for the picture element is compared with the picture element extracted in a later image and updated.

The updated value of the state vector and the covariance matrix corresponding to the error to be expected in image coordinates now form the basis for a renewed run for the estimate of the next system state.

The invention claimed is:

1. A method for recognizing and tracking of a moving object from a motor vehicle having a camera device arranged thereon, the method comprising:
   taking, using the camera device, images of an environment within a range of view of the camera device at time intervals, said images including picture elements;
   identifying for each image, with the aid of an image processing system, the picture elements in the image that correspond to a moving object to be tracked, and extracting a picture element that represents a projection in image coordinates of a spatial point where the object contacts a road plane; and
   tracking movement of the spatial point in the road plane using a state estimator that includes an at least four-dimensional state vector comprising a position of the spatial point in the road plane and an associated speed in the road plane; said tracking comprising the steps of:
   generating a prediction for the state vector;
   converting the prediction into image coordinates by suitable projection equations;
   calculating an error for the prediction in image coordinates by using a covariance matrix; and
   comparing the prediction with the picture element extracted in a later image, and
   updating the prediction based upon the comparison.

2. A method in accordance with claim 1, wherein the projection equations correspond to a projection of the road plane into an image plane computed using a pinhole camera.

3. A method in accordance with claim 1, wherein the state estimator comprises a Kalman filter.

4. A method in accordance with claim 1, wherein the state estimator uses a linear system equation to compute an estimated value for the state vector.

5. A method in accordance with claim 4, wherein the system equation is composed of a uniform movement of the spatial point in the road plane with the speed and a term that takes into account a translation and a rotation of the vehicle.

6. A method in accordance with claim 5, wherein the translation and the rotation of the vehicle are determined from data generated from a speed sensor and a yaw rate sensor.

7. A method in accordance with claim 5, wherein the translation and the rotation of the vehicle data is transformed into a coordinate system fixed with respect to the vehicle.

8. A method in accordance with claim 4, wherein the covariance matrix of the state vector comprises a term dependent on the system equation, a covariance matrix calculated in a preceding step and a noise matrix, said noise matrix modeling additive white acceleration noise.

9. A method in accordance with claim 8, wherein the covariance matrix corresponding to the error is composed of a constant noise covariance matrix and a variable covariance matrix, said variable covariance matrix computed by transformation from the covariance matrix of the state vector.

10. A method in accordance with claim 1, wherein a direction beam is determined for the extracted picture elements that includes the spatial points in the range of view that were projected onto the image of the respective picture element, and that the spatial point on the directional beam where the object contacts the road plane is determined using camera parameters of the camera device.

11. A method in claim 1, wherein the state estimator comprises a Kalman filter, and wherein during initialization of said Kalman filter, an initial error in the image plane is estimated and transformed to the road plane, and the result of the transformation is used to initialize terms for a position error in the covariance matrix, whereas terms for the variance of the speed in x and y directions is initialized with constant values and is considered statistically independent of the position error.

12. A data processing device comprising a media including computer-readable instructions for recognizing and tracking of a moving object from a motor vehicle having a camera device arranged thereon, said computer-readable instruction being adapted to configure the data processing device to carry out a method comprising:

taking, using the camera device, images of an environment within a range of view of the camera device at time intervals, said images including picture elements;

identifying for each image, with the aid of an image processing system, the picture elements in the image that correspond to a moving object to be tracked, and extracting a picture element that represents a projection in image coordinates of a spatial point where the object contacts a road plane; and tracking movement of the spatial point in the road plane using a state estimator that includes an at least four-dimensional state vector comprising a position of the spatial point in the road plane and an associated speed in the road plane; said tracking comprising the steps of:

generating a prediction for the state vector;

converting the prediction into image coordinates by suitable projection equations;

calculating an error for the prediction in image coordinates by using a covariance matrix; and comparing the prediction with the picture element extracted in a later image, and updating the prediction based upon the comparison.

13. An apparatus for the recognition and tracking of a moving object from a motor vehicle, said apparatus comprising a camera device arranged for taking an image, and a data processing device configured to carry out a method comprising:

taking, using the camera device, images of an environment within a range of view of the camera device at time intervals, said images including picture elements;

identifying for each image, with the aid of an image processing system, the picture elements in the image that correspond to a moving object to be tracked, and extracting a picture element that represents a projection in image coordinates of a spatial point where the object contacts a road plane; and tracking movement of the spatial point in the road plane using a state estimator that includes an at least four-dimensional state vector comprising a position of the spatial point in the road plane and an associated speed in the road plane; said tracking comprising the steps of:

generating a prediction for the state vector;

converting the prediction into image coordinates by suitable projection equations;

calculating an error for the prediction in image coordinates by using a covariance matrix; and comparing the prediction with the picture element extracted in a later image, and updating the prediction based upon the comparison.

\* \* \* \* \*